United States Patent [19]

Brown et al.

[11] Patent Number: 5,364,125
[45] Date of Patent: Nov. 15, 1994

[54] APPARATUS FOR PROTECTING AN OCCUPANT OF A VEHICLE UPON A SIDE IMPACT TO THE VEHICLE

[75] Inventors: Louis R. Brown, Oxford; Charles E. Steffens, Jr., Washington; Thomas H. Vos, Rochester; Edward J. Burley, Romeo, all of Mich.

[73] Assignee: TRW Vehicle Safety Systems Inc., Lyndhurst, Ohio

[21] Appl. No.: 139,215

[22] Filed: Oct. 19, 1993

[51] Int. Cl.$^5$ .............................................. B60R 21/22
[52] U.S. Cl. ................................ 280/730 A; 280/736; 280/742
[58] Field of Search ............... 280/730 R, 730 A, 736, 280/742; 180/268

[56] References Cited

U.S. PATENT DOCUMENTS

| | | | |
|---|---|---|---|
| 5,072,966 | 12/1991 | Nishitake et al. | 280/730 A |
| 5,172,790 | 12/1992 | Ishikawa et al. | 180/268 |
| 5,273,309 | 12/1993 | Lau et al. | 280/730 A |
| 5,277,441 | 1/1994 | Sinnmauber | 280/730 R |

*Primary Examiner*—Kenneth R. Rice
*Attorney, Agent, or Firm*—Tarolli, Sundheim & Covell

[57] ABSTRACT

An apparatus for restraining movement of a vehicle occupant in the event of a side impact to the vehicle includes an air bag module (10) in the vehicle door (12). The air bag module includes front (60) and rear (50) air bags, a source (70) of inflation fluid, and a flow control apparatus (94). The flow control apparatus (94) is actuatable into either a first condition for directing inflation fluid from the source into the front air bag (60) or a second condition for directing inflation fluid into the rear air bag (50). A sensor (26) senses the position of the vehicle occupant and provides a position signal indicative of the vehicle occupant's position. An actuator (80) is responsive to the position signal for actuating the flow control apparatus (94) into either the first or conditions. When the vehicle occupant's seat (20) is disposed forward of a predetermined position in the vehicle, the actuator (80) places the flow control apparatus (94) in the first condition to direct fluid from the inflation fluid source into only the front air bag (60). When the seat (20) is disposed rearward of the predetermined position in the vehicle, the actuator (80) places the flow control apparatus (94) in the second condition to direct fluid flow from the inflation fluid source only into the rear air bag (50).

20 Claims, 5 Drawing Sheets

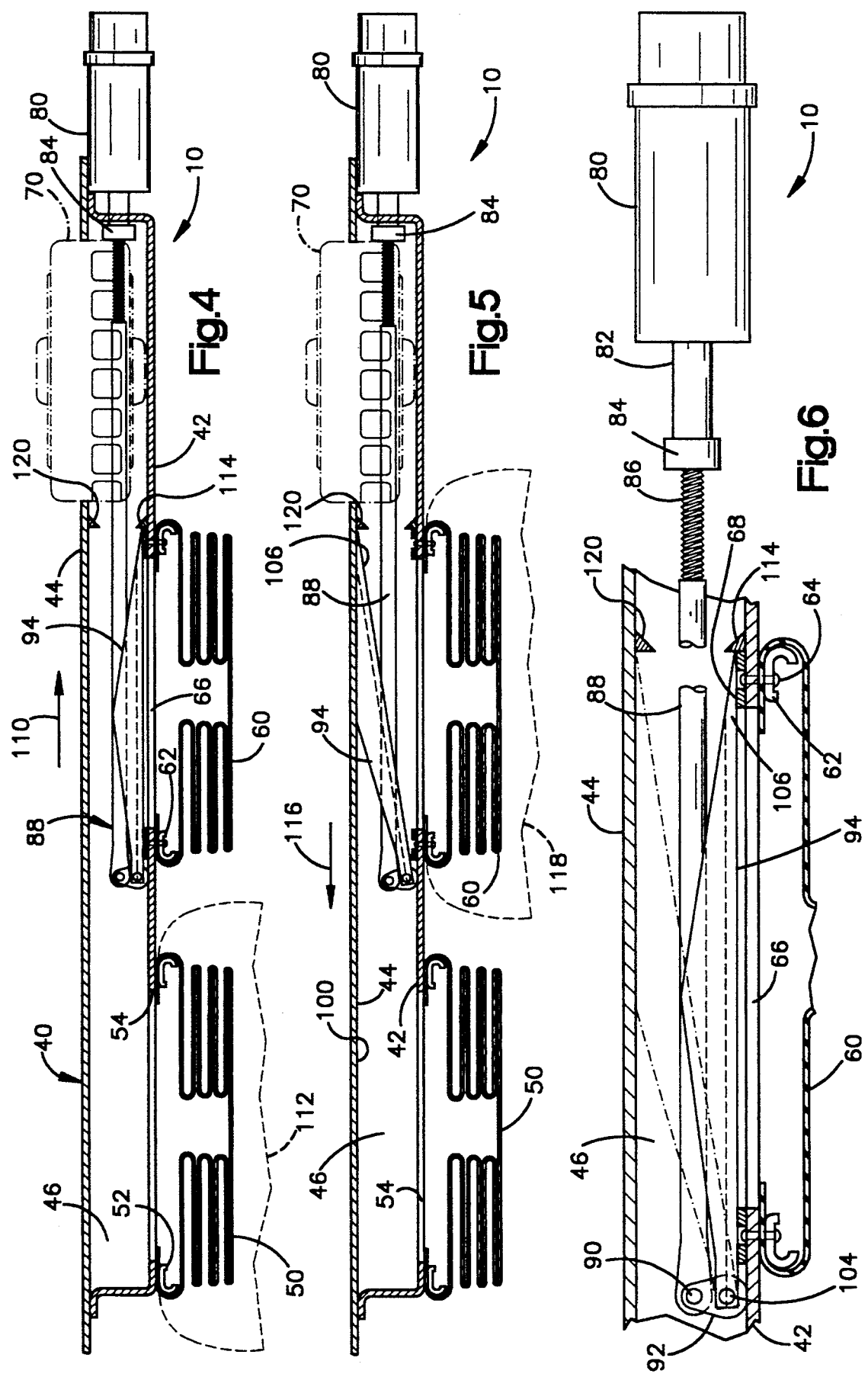

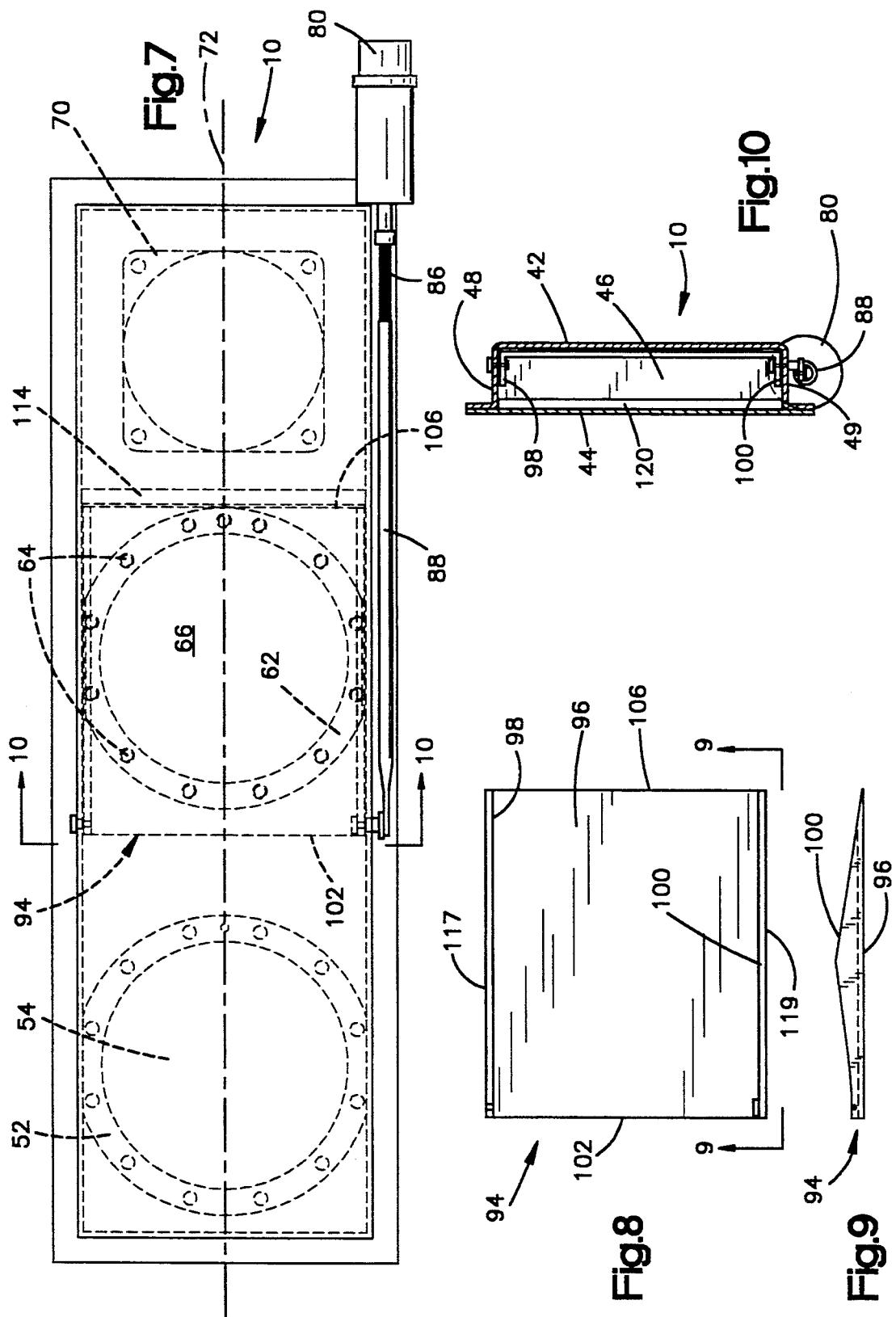

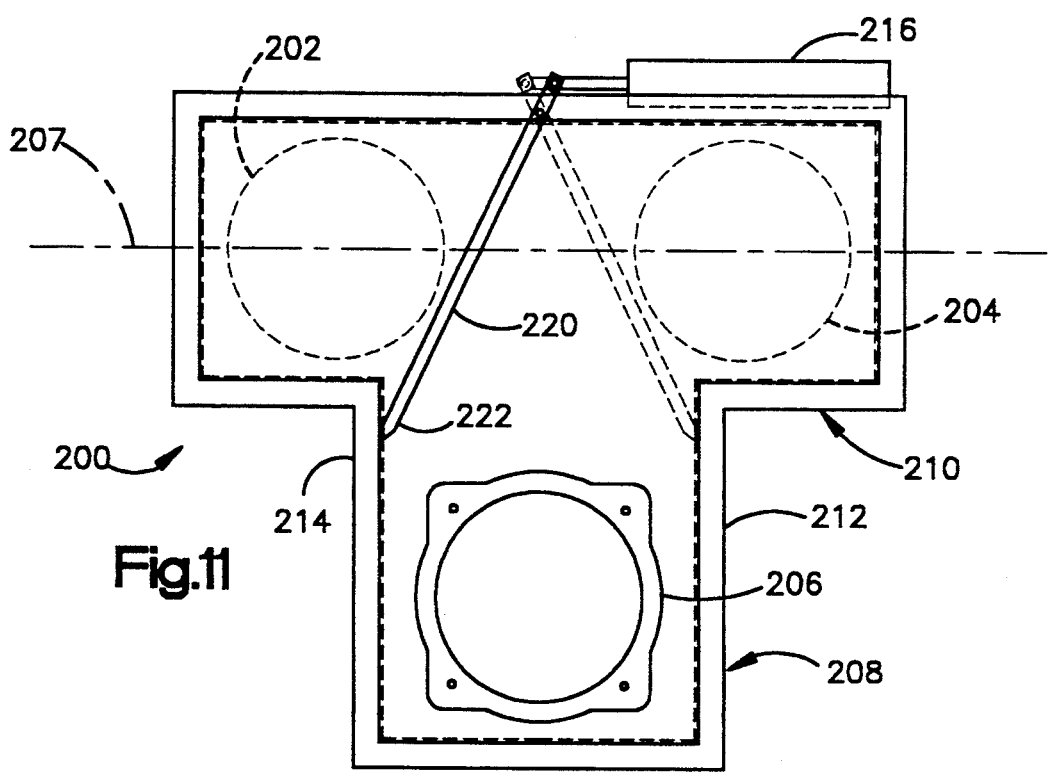
Fig.11
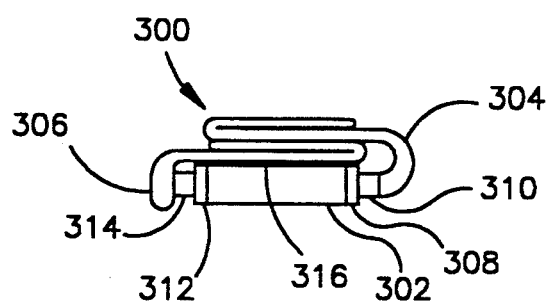
Fig.12
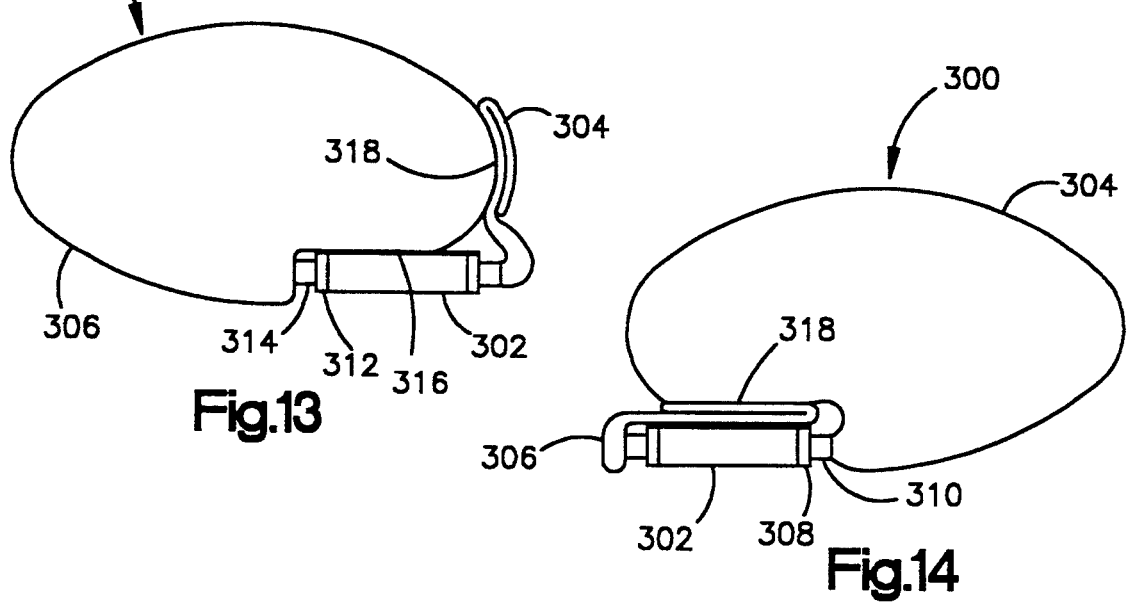
Fig.13
Fig.14

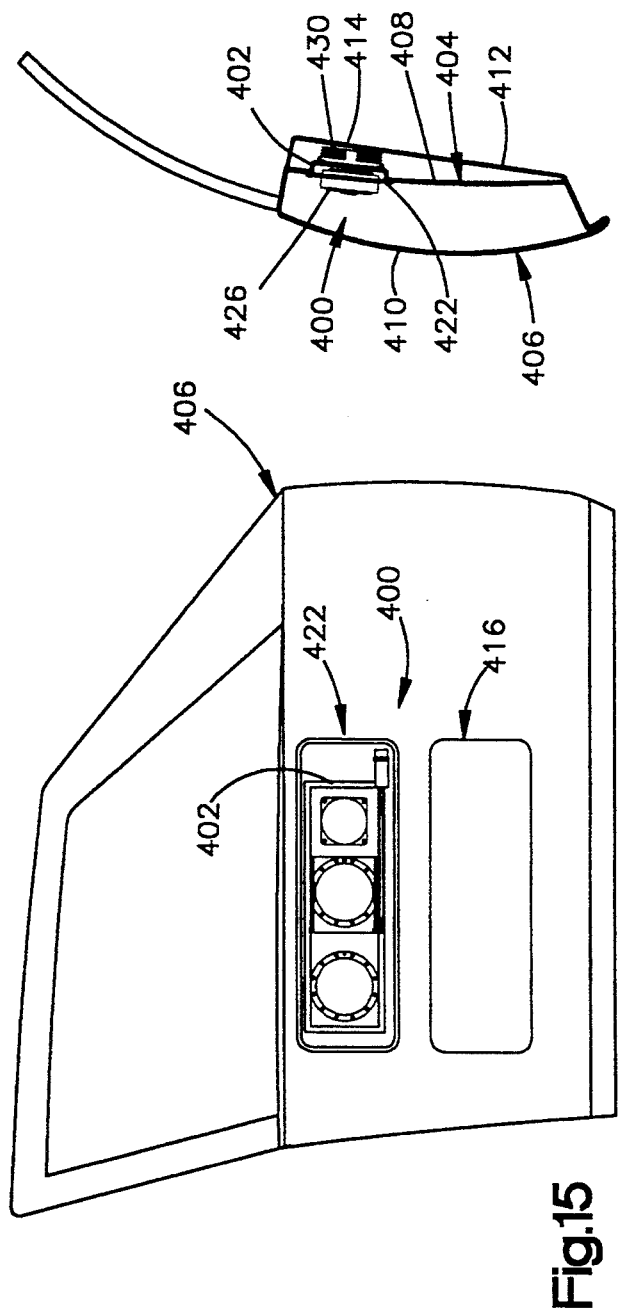
Fig.15
Fig.16
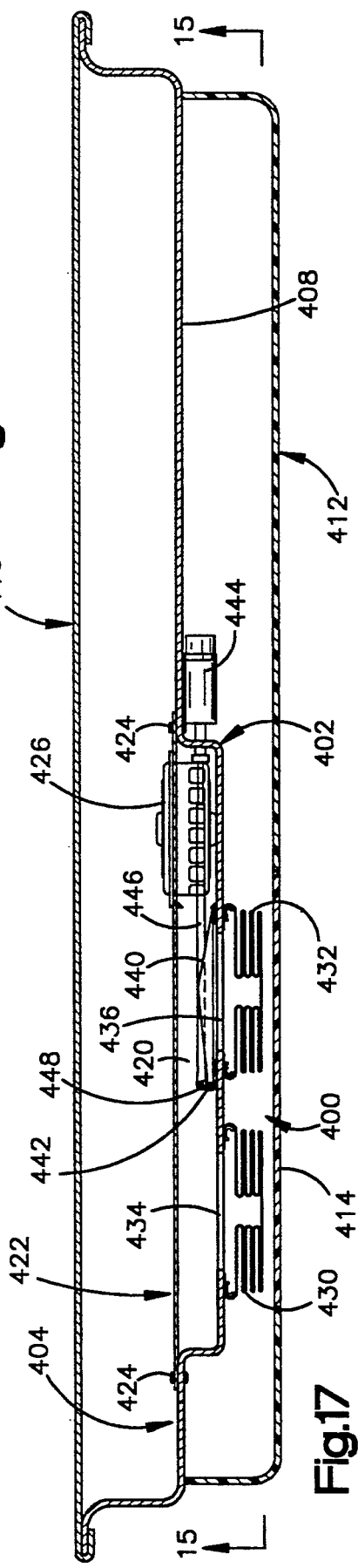
Fig.17

APPARATUS FOR PROTECTING AN OCCUPANT OF A VEHICLE UPON A SIDE IMPACT TO THE VEHICLE

BACKGROUND OF THE INVENTION

1. Technical Field

The present invention relates to an apparatus for protecting an occupant of a vehicle in the event of a collision or the like. The present invention is particularly directed to an apparatus for protecting an occupant of a vehicle in the event of a side impact to the vehicle.

2. Description of the Prior Art

It is known to use an inflatable air bag located in a vehicle door to protect an occupant of the vehicle in the event of a side impact to the vehicle. The air bag is inflated, when a side impact is sensed, to restrain movement of the vehicle occupant. However, because a vehicle occupant typically sits in a seat which is adjustable between different forward and rearward positions, the air bag, when inflated, may not be in the optimum position relative to the occupant.

In the occupant protection device shown in U.S. Pat. No. 5,072,966, two inflatable air bags are located in a vehicle door, one in front of the other. Each air bag has its own separate inflator. Regardless of the forward-/rearward position of the vehicle occupant's seat, both inflators are actuated in the event of a collision. Each air bag is inflated by its own inflator.

SUMMARY OF THE INVENTION

The present invention is a vehicle occupant restraint apparatus for restraining movement of a vehicle occupant in the event of a side impact to the vehicle. The apparatus includes first and second inflatable occupant restraints for, when inflated, restraining movement of the vehicle occupant. An inflation fluid source is associated with the inflatable occupant restraints for providing inflation fluid for inflating one of the inflatable occupant restraints. Flow control means is associated with the inflation fluid source. The flow control means is actuatable between a first condition for directing inflation fluid from the inflation fluid source into the first inflatable occupant restraint and a second condition for directing inflation fluid from the inflation fluid source into the second inflatable occupant restraint. The apparatus includes sensor means for sensing the position of the vehicle occupant and for providing a position signal indicative of the vehicle occupant's position. Actuator means is responsive to the position signal for actuating the flow control means between the first and second conditions.

In a preferred embodiment, the sensor means senses the position of the vehicle occupant's seat to provide a signal indicative of the vehicle occupant's position. An air bag module in the vehicle door includes first and second air bags as the first and second inflatable occupant restraints, the inflation fluid source, the flow control means, and the actuator means. The first air bag is 10 disposed in the module forward of the second air bag. When the sensor means indicates that the vehicle occupant's seat is disposed forward of a predetermined position in the vehicle, the actuator means actuates the flow control means into the first condition to enable fluid flow from the inflation fluid source into only the front air bag to inflate only the front air bag. When the sensor means indicates that the seat is disposed rearward of the predetermined position in the vehicle, the actuator means actuates the flow control means into the second condition to enable fluid flow from the inflation fluid source into only the rear air bag to inflate only the rear air bag.

BRIEF DESCRIPTION OF THE DRAWINGS

The foregoing and other features of the present invention will become apparent to one of ordinary skill in the art to which the present invention relates upon consideration of the following description of the invention with reference to the accompanying drawings, wherein:

FIG. 4 is a longitudinal sectional view of the air bag module of FIG. 1 taken along line 4—4 of FIG. 1 and showing a flow control valve in a first position for inflating the rear air bag;

FIG. 5 is a view similar to FIG. 4 and showing the flow control valve in a second position for inflating the front air bag;

FIG. 6 is an enlarged view showing the flow control valve of FIGS. 1-5;

FIG. 7 is a schematic side view of the air bag module of FIG. 4;

FIG. 8 is a side elevational view of a valve of the air bag module of FIG. 7;

FIG. 9 is a bottom plan view of the valve of FIG. 8 taken in the direction of line 9—9 of FIG. 8;

FIG. 10 is a sectional view taken along line 10—10 of FIG. 7;

FIG. 11 illustrates schematically an air bag module in accordance with a second embodiment of the invention;

FIG. 12 illustrates schematically an air bag module in accordance with a third embodiment of the invention;

FIG. 13 illustrates schematically the inflation of one of two air bags of the air bag module of FIG. 12;

FIG. 14 illustrates schematically the inflation of the other of the two air bags of the air bag module of FIG. 12;

FIG. 15 is a schematic illustration similar to FIG. 1 and showing a vehicle occupant restraint system with a fourth embodiment of the present invention;

FIG. 16 is a schematic illustration, similar to FIG. 3, showing the vehicle occupant restraint system of FIG. 15; and FIG. 17 is a longitudinal sectional view of the vehicle occupant restraint system of FIG. 15.

DESCRIPTION OF PREFERRED EMBODIMENTS OF THE INVENTION

The present invention relates to a vehicle occupant restraint for protecting an occupant of a vehicle in the event of a side impact to the vehicle. The present invention is applicable to various occupant restraint constructions.

Figure 1:
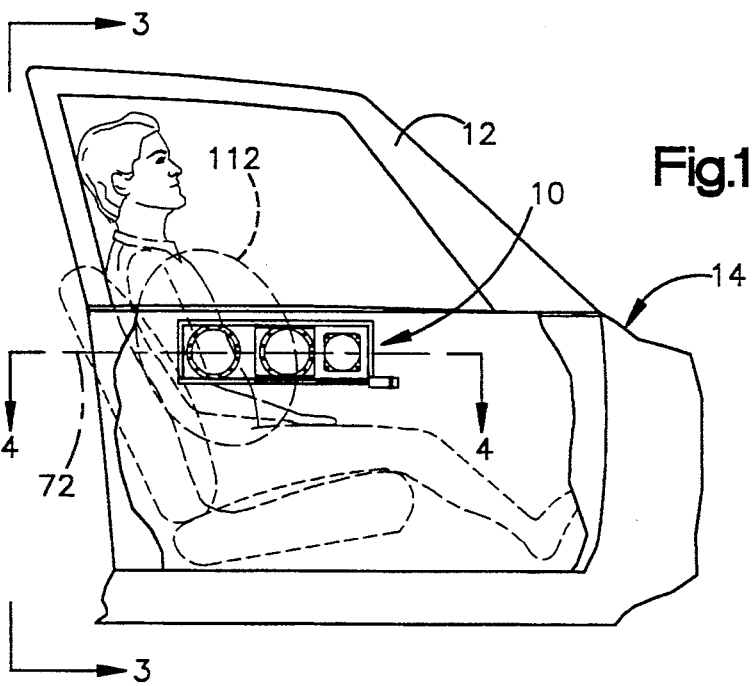
FIG. 1 is a schematic illustration of a vehicle with a vehicle seat in a rearward position and showing a door-mounted air bag module in accordance with the present invention including front and rear air bags.

As representative of the present invention, FIG. 1 illustrates a vehicle occupant restraint including an air bag module 10. The module 10 is fixed in a door 12 of a vehicle 14. The vehicle 14 includes a vehicle occupant seat 20 (FIG. 3) slidable on seat tracks 22 and 24. The seat 20 is slidable between a rearward position shown in FIG. 1 and a forward position shown in FIG. 2.

A seat position sensor switch indicated schematically at 26 (FIG. 3) is connected with the vehicle seat track 22. The seat position sensor switch 26 is operative to sense and indicate whether the vehicle seat 20 is disposed in the vehicle 14 forward or rearward of a predetermined position in the vehicle.

The air bag module 10 (FIG. 4) includes a housing 40 (FIGS. 4 and 10). The housing 40 is fixed to the vehicle door in a suitable known manner (not shown) such as by welding or by screws. The housing 40 includes a front wall 42, a back wall 44, a top wall 48 and a bottom wall 49 defining between them a chamber 46. The housing 40 and the chamber 46 have a generally rectangular cross-sectional configuration as best seen in FIG. 10.

A rear air bag 50, shown in solid lines in a deflated condition in FIG. 4, is secured to the housing front wall 42 by a retaining ring 52 and suitable fasteners (not shown). The interior of the rear air bag 50 is in fluid communication with the chamber 46 in the module 10 through a circular opening 54 in the housing front wall 42.

A front air bag 60 (FIG. 4) is secured to the housing front wall 42 by a retaining ring 62 and rivets 64. A circular opening 66 in the housing front wall 42 places the interior of the front air bag 60 in fluid communication with the housing chamber 46. An annular sealing ring 68 (FIG. 6) is secured inside the housing front wall 42. The sealing ring 68 extends around the outer periphery of the opening 66 in the housing front wall 42. The sealing ring 68 extends inwardly from the housing front wall 42 into the chamber 46 for a distance greater than the height of the rivets 64. Thus, the sealing ring 68 is engageable from the interior of the housing 40 to seal around the opening 66.

An inflator 70 is fixed to the housing 40. The inflator 70 is a known source of inflation fluid for inflating an air bag to restrain a vehicle occupant. The illustrated inflator 70 uses gas generating material to produce gas for inflating an air bag. The inflator 70 could also be a stored gas inflator or a hybrid inflator.

The inflator 70 and the front and rear air bags 60 and 50, respectively, are aligned along a front-to-rear axis 72 (FIGS. 1 and 7) of the air bag module 10 such that the center of each is at the same vertical position in the module 10. The inflator 70 is disposed forward of the front air bag 60 and the front air bag 60 is disposed forward of the rear air bag 50 when the module 10 is mounted in the vehicle. The front air bag 60 and the rear air bag 50 are spaced apart relative to each other, in the front-to-back direction, such that there is a 25% to 30% overlap between the area which would be occupied by the front air bag if it were inflated and the area which would be occupied by the rear air bag if it were inflated.

An actuator 80 is fixed to a forward portion of the housing 40 below the inflator 70 and the air bags 60 and 50. The actuator 80 is preferably a reversible electric motor having a hollow rotatable output shaft 82 that extends rearwardly along the housing 40. A ball cage 84 is fixed for rotation with the output shaft 82. The ball cage 84 is fixed axially relative to the housing 40. An externally threaded screw 86 is received in and engages the ball cage 84. Thus, rotation of the motor output shaft 82 and the ball cage 84 results in linear movement (to the left or right as viewed in FIGS. 4–6) of the screw 86. The actuator 80 may alternatively be another known actuator suitable to provide linear movement to the screw 86.

One end portion of a hollow tubular screw extension 88 is fixed on the screw 86. The other end portion of the screw extension 88 is flattened and connected by a pivot joint 90 to a link 92. The link 92 is fixed for movement with a valve 94. The valve 94 includes a rectangular plate 96 (FIGS. 8 and 9) having two stiffening ribs 98 and 100. The plate 96 and the stiffening ribs 98 and 100 are preferably made from metal about ⅛" thick to withstand the pressure of the inflation fluid directed by the inflator 70 into the chamber 46. A rear edge portion 102 of the valve 94 is pivotally mounted at 104 to the housing 40.

When the vehicle seat 20 (FIGS. 1–3) is moved along the seat tracks 22 and 24 into a position which is to the rear of a predetermined position, as illustrated in FIG. 1, the seat position sensor switch 26 is placed in a first condition. The seat position sensor switch 26 outputs a position signal along lead wires (not shown) to the actuator 80. The position signal is indicative of a rearward position of the vehicle occupant's seat 20, and therefore is presumably indicative of a rearward position of the vehicle occupant. Thus, the position of the vehicle occupant can be sensed by sensing the position of the seat 20.

The actuator 80 is energized by the output signal from the seat position sensor switch 26. The motor output shaft 82 and the ball cage 84 rotate in a first direction. The screw 86 is drawn axially to the right as viewed in FIG. 4, in a direction as indicated by the arrow 110. The screw extension 88 moves in the same direction, causing the valve 94 to pivot into the first position shown in FIG. 4. A front edge portion 106 of the valve 94 engages the sealing ring 68 and closes the front air bag opening 66 in the housing front wall 42 to block fluid communication between the housing chamber 46 and the forward air bag 60. The rear air bag 50 is in fluid communication with the chamber 46 through the rear air bag opening 54 in the housing front wall 42.

In the event of a side impact to the vehicle 14 when the valve 94 is in this first position, the inflator 70 is actuated in a known manner. The inflator 70 directs a large quantity of inflation fluid into the chamber 46 in the housing 40. With the valve 94 in the first position as shown in FIG. 4, the inflation fluid flows into only the rear air bag 50 to inflate only the rear air bag as shown schematically at 112 in FIGS. 1 and 4. Since the vehicle occupant is presumably toward the rear, as indicated by the sensed position of the vehicle seat 20, inflation of the rear air bag 50 is more likely to provide an optimum amount of protection for the vehicle occupant. A deflector 114 (FIGS. 4 and 6) on the housing front wall 42, extending between the housing top wall 48 and the bottom wall 49, directs inflation fluid away from the sealing ring 68. Deflecting inflation fluid away from the sealing ring 68 helps minimize leakage around the rivets 64 and block inflation fluid from entering between the valve 94 and the housing front wall.

Figure 2:
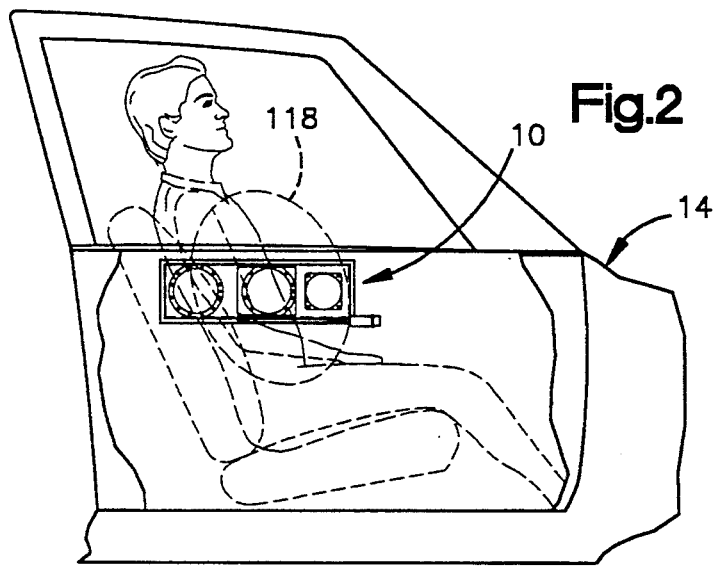
FIG. 2 is a schematic illustration, similar to FIG. 1, showing the vehicle seat in a forward position and the front air bag in its deployed position.

When the vehicle seat 20 is moved along the seat tracks 22 and 24 into a position which is forward of the predetermined position, as illustrated in FIG. 2, the seat position sensor switch 26 is placed in a second condition. The seat position sensor switch 26 outputs a position signal along lead wires (not shown) to the actuator 80 (FIG. 5). The position signal is indicative of a forward position of the seat 20, and therefore is presumably indicative of a forward position of the vehicle occupant.

The actuator 80 is energized by the output signal to rotate the motor output shaft 82 and the ball cage 84 in a second direction opposite to the first direction. The screw 86 and screw extension 88 are moved axially to the left as viewed in FIG. 5, in a direction as indicated by the arrow 116. The valve 94 pivots into the second position shown in FIG. 5. The forward edge portion 106 of the valve 94 seals against the housing back wall 44, blocking fluid flow between the inflator 70 and the rear air bag 50. Side portions 117 and 119 (FIG. 8) of the valve 94 seal against the top and bottom walls 48 and 49, respectively, of the housing 40.

In the event of a side impact to the vehicle 14 when the valve 94 is in the second position, the inflator 70 is energized in a known manner. The inflator 70 directs a large quantity of inflation fluid into the chamber 46 in the housing 40. The valve 94 prevents the inflation fluid from flowing out of the chamber 46 through the rear air bag opening 54 into the rear air bag 50. Inflation fluid from the inflator 70 flows through the chamber 46 and through the front air bag opening 66 into only the front air bag 60 to inflate only the front air bag as shown schematically at 118 in FIGS. 2 and 5. Since the vehicle occupant is presumably toward the front of the seat travel, as indicated by the sensed position of the vehicle seat 20, inflation of the front air bag 60 is more likely to provide an optimum amount of protection for the vehicle occupant. A deflector 120 on the housing back wall 44, extending between the housing top wall 48 and bottom wall 49, helps to block inflation fluid from passing between the valve 94 and the housing back wall 44.

FIG. 11 illustrates schematically a second embodiment of the invention. An air bag module 200 (FIG. 11) includes a rear air bag 202 and a front air bag 204. An inflator 206 is actuatable to provide a quantity of inflation fluid for inflating one or the other of the front and rear air bags 204 and 202. The front and rear air bags 204 and 202 are aligned along a front-to-rear axis 207 of the air bag module 200 such that the center of each is at the same vertical position in the module 200. The inflator 206 is disposed below the front and rear air bags 204 and 202, and the front air bag 204 is disposed forward of the rear air bag 202.

The inflator 206 is disposed in a downwardly projecting portion 208 of a housing 210. The housing portion 208 includes a front side wall 212 and a rear side wall 214. A linear actuator 216 connected with the housing 210 is actuatable in response to a position signal from the seat position sensor switch 26 (FIG. 3) to move a rectangular valve 220. The valve 220 has a first position (shown in solid lines in FIG. 11) in which an end portion 222 of the valve seals against the housing wall 214. The valve 220 has a second position (shown in phantom in FIG. 11) in which the end portion 222 of the valve seals against the front side wall 212 of the housing portion 208. Other edge portions (not shown) of the valve 220 seal against the other sides of the housing 210.

Figure 3:
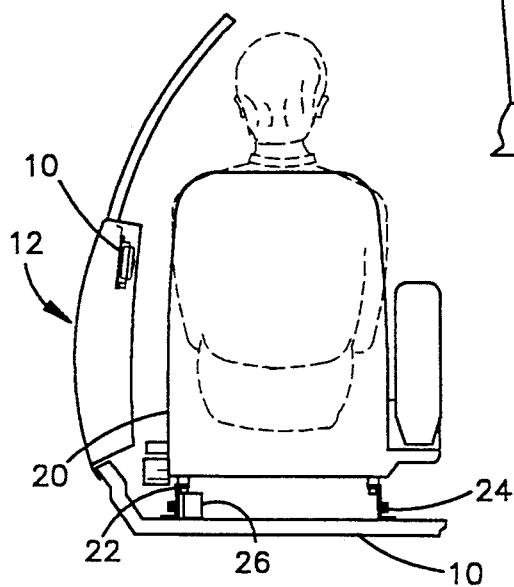
FIG. 3 is a schematic illustration taken in the direction of line 3—3 of FIG. 1.

The air bag module 200 is connectable with the seat position sensor switch 26 (FIG. 3). The valve 220 is actuated into the first position when the vehicle seat is moved into a position forward of a predetermined position (FIG. 2). The valve 220 is actuated into the second position when the vehicle seat is moved into a position rearward of a predetermined position (FIG. 1).

When the valve 220 is in the first position shown in solid lines in FIG. 11, inflation fluid from the inflator 206, upon actuation of the inflator in a known manner, is blocked from entering into the rear air bag 202. The inflation fluid thus flows into only the front air bag 204 to inflate only the front air bag. The pressure of the inflation gas helps to urge the valve 220 against the housing portion side wall 212 and against other portions of the housing 210, helping to seal and block fluid flow into the rear air bag 202. When the valve 220 is in the position shown in phantom in FIG. 11, inflation gas from the inflator 206 is blocked from entering into the front air bag 204, and flows into only the rear air bag 202 to inflate only the rear air bag. The pressure of the inflation gas urges the valve 220 against the housing portion side wall 214 and against other portions of the housing 210, helping to seal and block fluid flow into the front air bag 204.

FIGS. 12–14 illustrate schematically a third embodiment of the invention. An air bag module 300 includes a single stored gas or a single hybrid inflator 302 connected with front and rear air bags 304 and 306, respectively. The inflator 302 has a single container of stored gas. The inflator 302 is actuatable in a known manner to direct inflation fluid from the stored gas container into the front air bag 304 by rupturing a front burst disc 308 with a front actuator 310. The inflator 302 is actuatable in a known manner to direct inflation fluid from the stored gas container into the rear air bag 306 by rupturing a rear burst disc 312 with a rear actuator 314. A heat shield 316 is disposed between the inflator 302 and the air bags 304 and 306. The air bag module 300 is connectable with the seat position sensor switch 26 (FIG. 3).

In the event of a side impact to a vehicle 12 in which the air bag module 300 is located, the inflator 302 is actuated in a known manner. Depending on the forward or rearward position of the seat 20, as indicated by the seat position sensor switch 26, either the front air bag 304 or the rear air bag 306 is inflated. Thus, if the seat position sensor switch 26 indicates a rearward position of the vehicle seat 20, the rear actuator 314 ruptures the rear burst disc 312 to direct inflation fluid from the inflator 302 into the rear air bag 306 to inflate the rear air bag, as illustrated in FIG. 13. If the seat position sensor switch 26 indicates a forward position of the vehicle seat 20, the front actuator 310 ruptures the front burst disc 308 to direct inflation fluid from the inflator 302 into the front air bag 304 to inflate the front air bag, as illustrated in FIG. 14. The heat shield 316 protects the air bags 304 and 306 if heat is generated by the inflator 302 or by the actuators 310 or 314 upon actuation.

The front air bag 304 is preferably sewn to the rear air bag 306 at a stitching location indicated schematically at 318. When the rear air bag 306 is inflated as illustrated in FIG. 13, the front air bag 304 acts as a tether to limit rearward movement of the rear air bag and to maintain the rear air bag in its optimum position for protecting the vehicle occupant. When the front air bag 304 is inflated as illustrated in FIG. 14, the rear air bag 306 acts as a tether to limit forward movement of the front air bag and to maintain the front air bag in its optimum position for protecting the vehicle occupant.

FIGS. 15–17 illustrate a fourth embodiment of the invention. An air bag vehicle occupant restraint system 400 is integrated with a deep drawn section 402 of an inner door panel 404 of a vehicle door 406. The deep drawn section 402 projects inward from the plane of the main body portion 408 of the inner door panel 404. The vehicle door 406 also includes an outer door skin 410 and a trim panel 412 having a deployment door 414. An access hole 416 is formed in the inner door panel 404 below the deep drawn section 402.

The deep drawn section 402 of the inner door panel 404 serves as the inner wall of a manifold or inflation fluid chamber 420. An inflator mounting plate 422 is secured by fasteners 424 to the inner door panel 404. The inflator mounting plate 422 serves as the outer wall of the chamber 420. An inflator 426 is mounted on the inflator mounting plate 422.

A rear air bag 430 and a front air bag 432 are connected with the inner door panel section 402. Openings 434 and 436 in the inner door panel 404 place the interiors of the air bags 430 and 432, respectively, in fluid communication with the chamber 420. A valve 440 is pivotally mounted at 442 to the inner door panel 404. An actuator 444 is attached to the inner door panel 404. An actuator rod 446 extends from the actuator to a link 448 connected with the valve 440. The valve 440, actuator 444, and actuator rod 446 are similar to or the same as the corresponding parts in the embodiment shown in FIGS. 1-10.

Operation of the air bag module 400 is similar to operation of the air bag module 10 described above. When the vehicle seat 20 (FIGS. 1 and 2) is moved to a rearward position the actuator 444 is actuated to pivot the valve 440 about the pivot point 442 into a first position as shown in FIG. 17. In this position the valve 440 closes the opening 436 to the front air bag 432 and allows inflation fluid to flow from the inflator 426 into only the rear air bag 430. When the vehicle seat 20 is moved to a forward position the actuator 444 is actuated to pivot the valve 440 about the pivot point 442 into a second position uncovering the opening 436 to the front air bag 432 and allowing fluid to flow from the inflator 426 into only the front air bag.

From the above description of the invention, those skilled in the art will perceive improvements, changes and modifications in the invention. For example, an ultrasonic or radar sensor mounted in the vehicle dashboard or instrument panel may be substituted for the seat position sensor switch 26. Such improvements, changes and modifications within the skill of the art are intended to be covered by the appended claims.

We claim:

1. Apparatus for restraining movement of a vehicle occupant in the event of a side impact to the vehicle, said apparatus comprising first and second inflatable occupant restraints for, when inflated, restraining movement of the vehicle occupant, an inflation fluid source associated with said first and second inflatable occupant restraints for providing inflation fluid for said inflatable occupant restraints, means for mounting said inflatable occupant restraints for inflation between a lateral side of the vehicle and the side of a vehicle occupant, flow control means associated with said inflation fluid source and actuatable between a first condition for directing inflation fluid from said inflation fluid source into said first inflatable occupant restraint and a second condition for directing inflation fluid from said inflation fluid source into said second inflatable occupant restraint, sensor means for sensing the position of the vehicle occupant and for providing a position signal indicative of the vehicle occupant's position, and actuator means responsive to the position signal for actuating said flow control means between the first and second conditions.

2. A vehicle occupant restraint apparatus as set forth in claim 1 for restraining movement of a vehicle occupant in a seat in a vehicle, said sensor means including seat position sensing means for sensing the position of the vehicle occupant's seat and for providing a position signal indicative of the seat position, said actuator means including means responsive to the position signal for actuating said flow control means between the first and second conditions.

3. A vehicle occupant restraint apparatus as set forth in claim 2 wherein said seat position sensing means includes a switch movable into a first condition when the seat is moved forward of a predetermined position in the vehicle and movable into a second condition when the seat is moved rearward of the predetermined position in the vehicle, said actuator means actuating said flow control means into the first condition when said seat position switch is in the first condition and said actuator means actuating said flow control means into the second condition when said seat position switch is in the second condition.

4. A vehicle occupant restraint apparatus as set forth in claim 3 wherein said means for mounting said inflatable occupant restraints mounts said first inflatable occupant restraint in the vehicle at a location spaced forward of said second inflatable occupant restraint.

5. A vehicle occupant restraint apparatus as set forth in claim 1 wherein said flow control means comprises a valve member movable by said actuator means between a first condition enabling fluid flow from said inflation fluid source into said first inflatable occupant restraint and blocking fluid flow from said inflation fluid source into said second inflatable occupant restraint, and a second condition enabling fluid flow from said inflation fluid source into said second inflatable occupant restraint and blocking fluid flow from said inflation fluid source into said first inflatable occupant restraint.

6. A vehicle occupant restraint apparatus as set forth in claim 5 wherein said means for mounting said inflatable occupant restraints includes a housing having surfaces defining first and second openings communicating with said first and second inflatable occupant restraints, respectively, and further including means for supporting said valve member for pivotal movement between a first position closing the first opening to block fluid flow therethrough and a second position enabling fluid flow through the first opening and blocking fluid flow from said inflation fluid source through the second opening.

7. A vehicle occupant restraint apparatus as set forth in claim 6 wherein said actuator means comprises an electric motor and a drive member extending between said electric motor and said valve member, said drive member being movable linearly by said electric motor to move said valve member between its first and second positions.

8. A vehicle occupant restraint apparatus as set forth in claim 1 wherein said means for mounting comprises a housing receiving said valve member, said valve member when in the first condition extending transverse to the path of fluid flow from said inflation fluid source and to a wall of said housing, said inflation fluid urging said valve member into sealing engagement with said housing wall, said valve member when in the second condition extending generally parallel to the path of fluid flow from said inflation fluid source and to said housing wall.

9. A vehicle occupant restraint apparatus as set forth in claim 1 wherein said means for mounting said inflatable occupant restraints mounts said first inflatable occupant restraint in the vehicle at a location forward of said second inflatable occupant restraint, and said actuator means comprises a motor and a drive member extending between said motor and said flow control means, said drive member being movable linearly by said motor to actuate said flow control means between the first and second conditions.

10. A vehicle occupant restraint apparatus as set forth in claim 1 wherein said means for mounting said inflatable occupant restraints comprises a housing having means for mounting said first and second inflatable occupant restraints and said inflation fluid source in an aligned relationship along a front-to-rear axis of said housing with said inflation fluid source being disposed forward of said first inflatable occupant restraint and said first inflatable occupant restraint being disposed forward of said second inflatable occupant restraint.

11. A vehicle occupant restraint apparatus as set forth in claim 1 wherein said means for mounting said inflatable occupant restraints comprises a housing having means for mounting said first and second inflatable occupant restraints and said inflation fluid source with said first and second inflatable occupant restraints being aligned along a front-to-rear axis of said housing and said inflation fluid source being disposed below said first and second inflatable occupant restraints and said first inflatable occupant restraint being disposed forward of said second inflatable occupant restraint.

12. A vehicle occupant restraint apparatus as set forth in claim 1 wherein said means for mounting said first and second inflatable occupant restraints comprises an inner door panel of the vehicle, said apparatus further comprising mounting panel means for mounting said inflation fluid source to said inner door panel, said mounting panel means and said inner door panel defining between them an inflation fluid chamber in fluid communication with said inflation fluid source, said first and second inflatable occupant restraints being connected with said inner door panel, said inner door panel including surface means for establishing fluid communication through said inner door panel between said inflation fluid chamber and said first and second inflatable occupant restraints.

13. A vehicle occupant restraint apparatus as set forth in claim 12 wherein said inner door panel includes a generally planar main body portion and a second portion projecting inward from the plane of said main body portion toward the vehicle occupant, said mounting panel means comprising an inflator mounting panel connected with said inner door panel main body portion, said surface means for establishing fluid communication through said inner door panel being on said second portion.

14. A vehicle occupant restraint apparatus for restraining movement of a vehicle occupant in the event of a side impact to the vehicle,. comprising first and second inflatable occupant restraints for, when inflated, restraining movement of the vehicle occupant, an inflator associated with said first and second inflatable occupant restraints for providing gas for inflating one or the other of said first and second inflatable occupant restraints, means for mounting said first and second inflatable occupant restraints for inflation between a lateral side of the vehicle and the side of a vehicle occupant, flow control means associated with said inflator and actuatable into a first condition for directing gas from said inflator into said first inflatable occupant restraint and a second condition for directing gas from said inflator into said second inflatable occupant restraint, sensor means for sensing the position of the vehicle occupant and for providing a position signal indicative of the vehicle occupant's position, and actuator means responsive to the position signal for actuating said flow control means into either the first or second condition, said flow control means comprising spaced apart first and second valve means on said inflator blocking fluid flow from said inflator at spaced apart locations, said actuator means comprising first and second actuators for selectively opening a selected one of said first and second valve means, respectively, to enable gas to flow from said single inflator into a selected one of said first and second inflatable occupant restraints in response to the position signal indicative of the vehicle occupant's position.

15. A vehicle occupant restraint apparatus as set forth in claim 14 wherein said first and second valve means comprise burst discs and said first and second actuators comprise means for bursting a selected one of said burst discs.

16. A vehicle occupant restraint apparatus as set forth in claim 14 wherein said inflatable occupant restraints are air bags and further including means for attaching said first and second air bags together, the uninflated one of said air bags acting as a tether for the inflated one of said air bags to control movement of the inflated one of said air bags.

17. A vehicle occupant restraint apparatus as set forth in claim 14 for restraining movement of a vehicle occupant in a seat in the vehicle wherein said sensor means includes seat position sensing means for sensing the position of the vehicle occupant's seat and for providing a position signal indicative of the seat position, said actuator means being responsive to the position signal for actuating said flow control means into either the first or the second condition.

18. A vehicle occupant restraint apparatus as set forth in claim 17 wherein said seat position sensing means includes a switch movable into a first condition when the seat is moved forward of a predetermined position in the vehicle and movable into a second condition when the seat is moved rearward of the predetermined position in the vehicle, said actuator means actuating said flow control means into the first condition when said seat position switch is in the first condition and said actuator means actuating said flow control means into the second condition when said seat position switch is in the second condition.

19. Apparatus for restraining movement of a vehicle occupant in a seat in a vehicle in the event of a side impact to the vehicle, comprising:

sensor means for sensing the position of the vehicle occupant's seat and for providing a position signal indicative of the vehicle occupant's seat; and an inflatable occupant restraint including:

front and rear inflatable occupant restraints for, when inflated, restraining movement of the vehicle occupant, an inflation fluid source associated with said front and rear inflatable occupant restraints for providing inflation fluid for inflating one of said inflatable occupant restraints, means for mounting said front and rear inflatable occupant restraints and said inflation fluid source to a door of the vehicle, flow control means associated with said inflation fluid source and actuatable between a first condition for directing inflation fluid from said inflation fluid source into said front inflatable occupant restraint and a second condition for directing inflation fluid from said inflation fluid source into said rear inflatable occupant restraint, and actuator means responsive to the position signal for actuating said flow control means between the first and second conditions.

20. Apparatus for restraining movement of an occupant of a vehicle having a door adjacent the vehicle occupant, said apparatus comprising:

first and second inflatable occupant restraints for, when inflated, restraining movement of the vehicle occupant;

means for mounting said inflatable occupant restraints for inflation between a lateral side of the vehicle and the side of a vehicle occupant, said means for mounting comprising an inner door panel of the vehicle door;

an inflation fluid source associated with said first and second inflatable occupant restraints for providing inflation fluid for said inflatable occupant restraints;

mounting panel means for mounting said inflation fluid source to said inner door panel, said mounting panel means and said inner door panel defining between them an inflation fluid chamber in fluid communication with said inflation fluid source;

said inner door panel including surface means for establishing fluid communication through said inner door panel between said inflation fluid chamber and said first and second inflatable occupant restraints;

flow control means associated with said inflation fluid source and actuatable between a first condition for directing inflation fluid from said inflation fluid source into said first inflatable occupant restraint and a second condition for directing inflation fluid from said inflation fluid source into said second inflatable occupant restraint;

sensor means for sensing the position of the vehicle occupant and for providing a position signal indicative of the vehicle occupant's position; and actuator means responsive to the position signal for actuating said flow control means between the first and second conditions.

* * * * *